United States Patent

Lonardi et al.

Patent Number: 5,513,581
Date of Patent: May 7, 1996

[54] DISTRIBUTOR CHUTE FOR BULK MATERIAL

[75] Inventors: Emile Lonardi, Bascharage; Gilbert Bernard, Helmdange; Giovanni Cimenti, Fentange; Radomir Andonov, Mamer; Joseph Hollman, Olm; Guy Thillen, Diekirch, all of Luxembourg

[73] Assignee: Paul Wurth S.A., Luxembourg

[21] Appl. No.: 292,806

[22] Filed: Aug. 9, 1994

[30] Foreign Application Priority Data

Aug. 25, 1993 [LU] Luxembourg .................. 88396

[51] Int. Cl.$^6$ ................................................ F23K 3/16
[52] U.S. Cl. ........................... 110/116; 193/3; 193/4; 193/2 C; 193/32; 110/115
[58] Field of Search ........................ 110/101 R, 102, 110/107, 111, 115, 116, 117, 267, 293, 294; 193/1, 2 R, 3, 4, 5, 16, 17, 2 C, 32; 414/193, 194, 195, 208, 299

[56] References Cited

U.S. PATENT DOCUMENTS

| | | | |
|---|---|---|---|
| 3,889,791 | 6/1975 | Legille et al. | 193/3 |
| 5,299,900 | 4/1994 | Mailliet et al. | 414/208 |

FOREIGN PATENT DOCUMENTS

| | | |
|---|---|---|
| 3406683 | 9/1985 | Germany . |
| 3729295 | 6/1988 | Germany . |
| 4216166 | 12/1992 | Germany . |
| 1487527 | 10/1977 | United Kingdom . |

OTHER PUBLICATIONS

Soviet Patent Abstract; "Blast Furnace Charge Distributor has Stabilising Fin at Perimeter of Distribution Element to Hold Back Layers of Charge"; 1989 Derwent Publications Ltd.

Primary Examiner—Henry A. Bennet
Assistant Examiner—Susanne C. Tinker
Attorney, Agent, or Firm—Fishman, Dionne & Cantor

[57] ABSTRACT

A distributor chute for bulk material, in particular for use in a bell-less blast furnace top charging device, has several inclined transverse plates in the region of its impact zone. The transverse plates create retaining pockets between their inner faces and the surface of the distributor chute. Two adjacent transverse plates limit between the outer face of the first transverse plate and the inner face or the second transverse plate a retaining chamber. If the inclination of the chute is reduced, the bulk material moves from the retaining pocket to the retaining chamber.

13 Claims, 2 Drawing Sheets

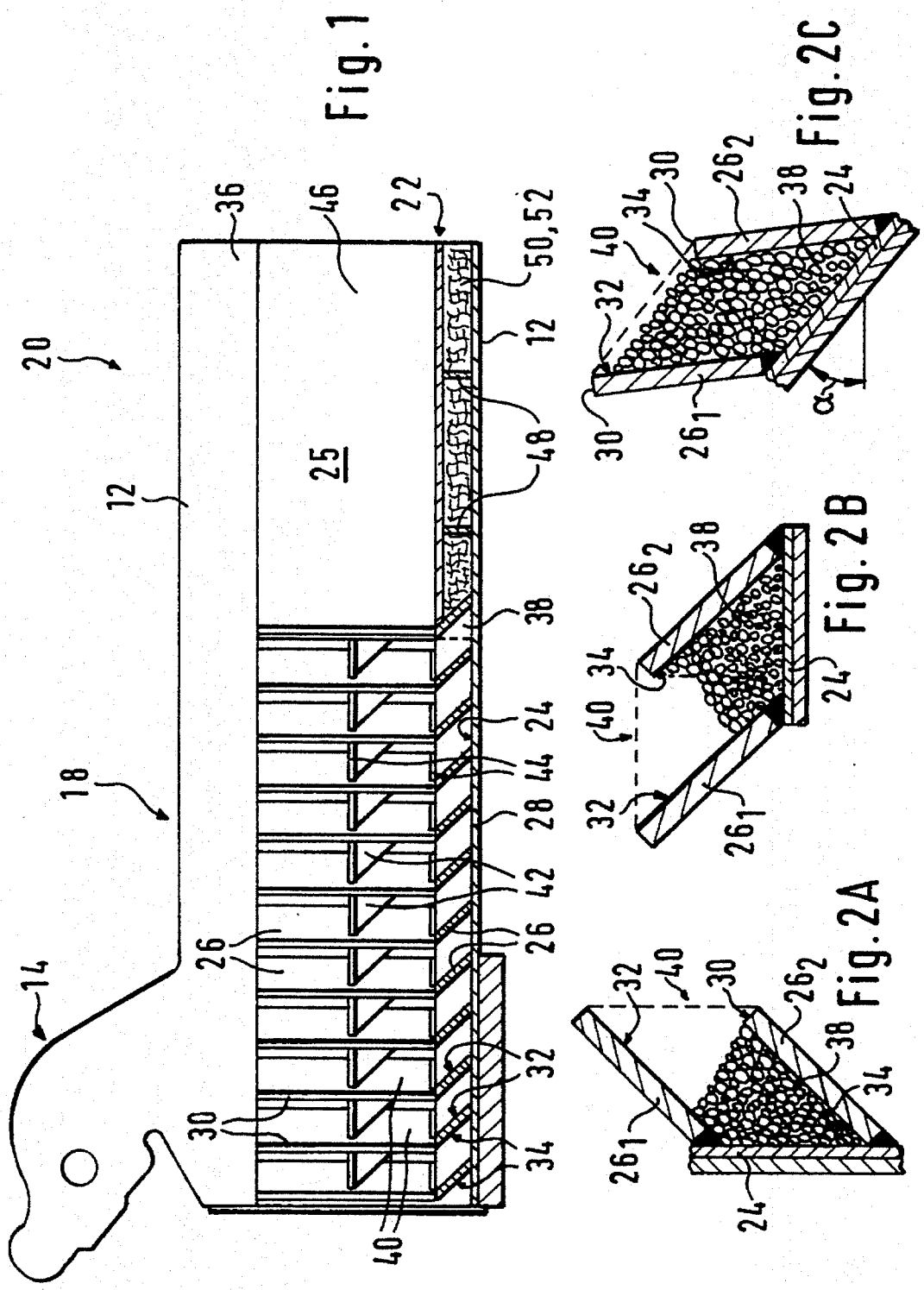

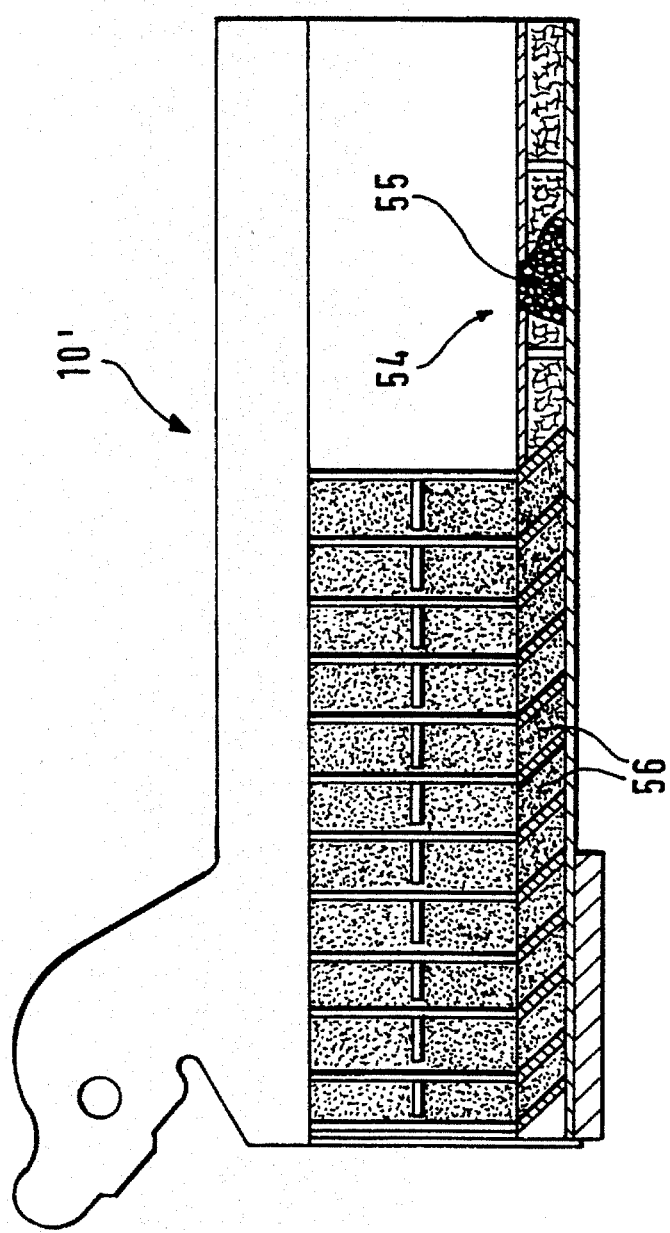
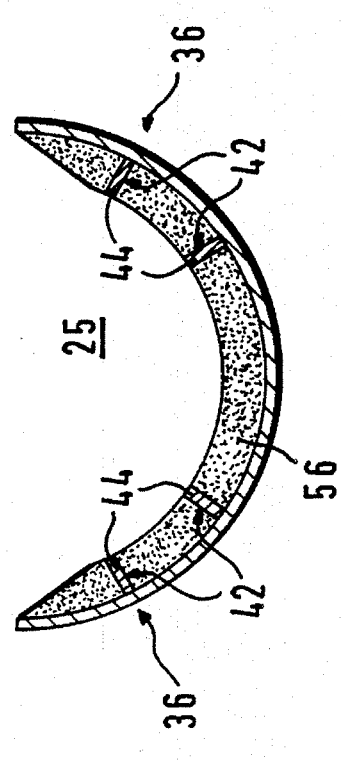

DISTRIBUTOR CHUTE FOR BULK MATERIAL

BACKGROUND OF THE INVENTION

The invention relates to a distributor chute for bulk material, in particular for use in a bell-less blast furnace top charging device.

In bell-less blast furnace top charging devices the charging material falls in metered quantities from an intermediate hopper through a vertically arranged central feed channel onto a distributor chute. This distributor chute is arranged centrally in the blast furnace top, can be rotated about the vertical axis of the blast furnace and pivoted about a horizontal axis, to change its inclination. The charging material, which consists of ore, coke, iron sinter etc., is a very hard, sharp-edged bulk material, which makes great demands on the distributor chute. This abrasive bulk material first strikes the distributor chute with a considerable impact energy in an impact zone of the chute and then tumbles down a sliding zone of the chute at a high speed. It follows that the distributor chute is subjected to a high degree of wear and must be changed frequently, which involves high costs and necessitates bringing operation of the blast furnace to a standstill.

German patent specification DE-A-23 25 531 (corresponding to U.S. Pat. No. 3,889,791 discloses a distributor chute of a bell-less blast furnace top charging device which has an outer shell of heat-resisting steel and a lining of individual wearing plates detachably secured to the outer shell. These wearing plates are arranged like scales, partially covering each other so that, in the direction of flow of the material, the lower part of each plate protrudes with respect to its upper part. They consist of a carrier plate of a thick-walled heat-resisting steel plate. A layer of hard material resistant to abrasion is welded onto this carrier plate.

To further reduce the wear and tear of this wearing plates disclosed in DE-A-23 25 531, German patent specification DE-A-26 29 782 proposes welding a small retaining ridge perpendicularly onto the surface of the overlapping wearing plates. In practice, it has been found, that these welded-on retaining ridges are primarily effective in the sliding zone of the chute, in that they reduce the speed of the bulk material directly adjacent to the surface of the wearing plates. In the impact zone the wear reducing effect of the welded-on retaining ridges is however insignificant.

Further disadvantages of the known overlapping wearing plates are their detrimental effect on the concentration of the flow of bulk material in the sliding zone, their high manufacturing costs and the high weight of a distributor chute with overlapping wearing plates.

SUMMARY OF THE INVENTION

It is an object of the present invention to provide a lighter distributor chute, in particular for use in a bell-less blast furnace top charging device, which has an excellent protection against wearing in the impact zone.

According to the invention this aim is achieved with a distributor chute for bulk material for use in a bell-less blast furnace top charging device, which has an upper surface defining an impact zone and a sliding zone receptive to the bulk material. The distributor chute includes a plurality of inclined transverse plates disposed on the upper surface within the impact zone. Each of the transverse plates has an inner face, a generally wear-resistant upper edge and a generally wear-resistant outer face. The transverse plates are inclined in a direction generally opposite to the flow of the bulk material to define retaining pockets between the inner faces of the transverse plates and the upper surface of the distributor chute. The transverse plates are spaced wherein each of two adjacent transverse plates define between the outer face of the first one of two adjacent transverse plates and the inner face of the second one of two adjacent transverse plates a retaining chamber with a free access opening delimited between the generally wear-resistant upper edges of the first and second two adjacent transverse plates. Each of said retaining pockets has a net volume which comprises a substantial proportion of the net total volume of the corresponding retaining chamber.

A considerable advantage of the chute according to the invention consists in that an excellent wear-resistance in the impact zone is achieved with little expenditure on material. When the distributor chute is steeply inclined (i.e., the distributor chute is almost vertical), the bulk material in the retaining pockets causes an effective damping of the impact of the falling bulk material. In this position of the distributor chute, exclusively the substantially wear-resistant upper edges of the inclined transverse plates are stressed by the impacting bulk material. The substantially wear-resistant outer faces of the inclined transverse plates are not directly subjected to the impacting bulk material. The surface of the distributor chute between the transverse plates, and also the inner faces of the transverse plates, are to a large extent protected by the bulk material in the retaining pockets. If the distributor chute is pivoted from a steeply inclined position into a less steeply inclined position, (i.e., the distributor chute is set to a more horizontal position), the full retaining pockets empty partially into the remaining region of the retaining chambers and thus progressively cover the part of the surface of the distributor chute between the transverse plates, which may still be exposed, and then the substantially wear-resistant outer faces of the transverse plates. The surface of the chute in the retaining chambers, and the outer faces of the transverse plates are then (at least partially) protected against impacting particles by the bulk material pouring from the retaining pockets. To achieve a satisfactory initial covering, the net volume of a retaining pocket should preferably be at least 20% of the net volume of the associated retaining chamber. The falling bulk material fills the retaining chambers further. If the chute is more steeply inclined again, part of the entrapped bulk material flows into the retaining pockets again. Changing the inclination of the chute accordingly effects a reversible shifting of material between the retaining pocket and the remaining region of the retaining chamber, the material always being located in sufficient quantity where it is most effective for protection against wear.

It should be noted that the largest part of the resistance to wear in the impact zone is achieved in and by the material in and by the retaining pockets and retaining chambers, respectively. Only relatively small wear-resistant reinforcement of the chute are required. Therefore, the construction of the chute may be substantially lighter and less expensive.

It is preferred that the retaining pockets have an opening angle of between 40° and 60° to the surface of the chute. The width of the free opening of the retaining chambers is preferably larger than the largest, statistically relevant particle diameter of the bulk material. This ensures proper filling of the retaining chambers.

The retaining chambers are preferably subdivided by longitudinal plates. The latter reinforce the transverse plates. Segmentation of the retaining chambers ensures a more uniform filling of the retaining chambers in the lateral regions of the chute.

To achieve a concentrated stream of bulk material that is as homogeneous as possible as it leaves the sliding zone of the distributor chute, the distributor chute has a substantially smooth and wear-resistant discharge surface, at least in the discharge region of the sliding zone.

In a preferred embodiment of the distributor chute of the present invention, a smooth discharge surface extends a flow surface defined by the upper edges of the transverse plates without any transitional discontinuity. The bulk material slides continuously from the impact zone into the discharge region, and the wear to which the discharge surface is subjected is substantially reduced.

Between the discharge surface and the actual chute body there are preferably hollow compartments. These hollow compartments have the advantage that they fill up with bulk material if there is a rupture in the discharge surface. The bulk material in the hollow compartments will then protect the chute body against wear. These hollow compartments may be filled with a thermal insulation material. When using the chute in a furnace (for example, a blast furnace), the discharge surface is substantially thermally insulated with respect to the hot chute body of the chute which has a beneficial effect on the serviceable life of the discharge surface.

In another embodiment of the distributor chute of the present invention, the retaining chambers are filled with a castable, hardening mass. In its hardened state this mass can be less wear-resistant than the upper edges and outer surfaces of the transverse plates. Even though the hardened mass is destroyed more quickly than the transverse plates, this has no substantial adverse effect on the serviceable life of the distributor chute. Major holes that may appear in the filling mass fill up immediately with bulk material, or with broken pieces of the filling material. An advantage of the filled retaining chambers is that as long as the filling is substantially intact, the sliding properties in the impact zone are improved. Suitable shaped blocks could, of course, be inserted in the retaining chambers instead of the castable material.

The above-discussed and other features and advantages of the present invention will be appreciated and understood by those skilled in the art from the following detailed description and drawings.

BRIEF DESCRIPTION OF THE DRAWINGS

Referring now to the drawings wherein like elements are numbered alike in the several FIGURES:

FIG. 1 is a longitudinal sectional view through a first embodiment of a distributor chute in accordance with the present invention;

FIGS. 2a, 2b and 2c are detail views of the distributor chute of FIG. 1, for different angles of inclination of the distributor chute;

FIG. 3 is a longitudinal sectional view through a second embodiment of a distributor chute in accordance with the present invention; and FIG. 4 is a cross-sectional view through the distributor chute of FIG. 3.

DESCRIPTION OF THE PREFERRED EMBODIMENT

Referring first to FIG. 1, a distributor chute 10 has a chute body 12 of semi-circular cross-section (FIG. 4). The chute cross-section could, of course, also be oval, trapezoidal or triangular. The chute could likewise be bounded only on one side by a lateral face, or have no lateral faces at all.

At a first end, the chute body 12 has on both sides a suspension device 14 by which the distributor chute 10, is suspended in a drive means (not shown). This drive means causes the chute 10, to pivot about a horizontal axis in order to adjust the angle of inclination of the chute. Optionally this drive means causes a rotary movement of the chute about a vertical axis in order to distribute the bulk material over a circular surface.

The chute 10 has an impact zone 18 and a sliding zone 20. The impact zone 18 is located beneath a feed channel (not shown) for the bulk material. It catches the incoming bulk material and diverts it to the sliding zone 20. A statistically definable impact point of the stream of bulk material changes its position within the impact zone 18 as a function of the inclination of the chute 10. For the purposes of this description, the impact zone 18 is therefore defined as that portion of the chute 10, in which the statistically defined impact point of the flow of bulk material can be located. The sliding zone 20, adjoining the impact zone 18, concentrates the diverted bulk material and discharges it by way of a discharge spout 22 in as concentrated a stream as possible. The length of the actual sliding zone depends, of course, on the inclination of the chute 10. For the purposes of this description, the sliding zone 20 is therefore defined as that portion of the chute 10 which serves exclusively for sliding purposes. In other words, the sliding zone 20 corresponds to that portion of the chute 10, in which extends between the impact zone 18 and the discharge spout 22.

In the impact zone 18, the chute 10 has several transverse plates 26 on an inner face 24 of the actual chute channel 25. These transverse plates 26 may be formed directly as components of the chute body 12, or be secured individually thereto, or may be integral with a carrier body 28. This carrier body 28 is inserted in the chute 10 and secured therein. The transverse plates have an upper edge 30, an outer face 32 and an inner face 34. A layer of a wear-resisting hard material is advantageously welded onto the upper edge 30 and the outer face 32. The inner face 34 can likewise be protected against wear, but this is not absolutely essential. The transverse plates 26 could, of course, also be integrally formed from a material having a relatively high wear-resistance.

The transverse plates 26 extend transversely to the flow direction as far as the lateral walls 36 of the chute 10. They are inclined in the opposite direction to the flow of the bulk material so that between their inner face 34 and the inner face 24 of the chute 10, they form retaining pockets 38, as shown in FIGS. 2A, 2B, 2C. The opening angle of these retaining pockets is preferably about 45°. Two adjacent transverse plates $26_1$, $26_2$ form between the outer face 32 of the first transverse plate $26_1$ and the inner face 34 of the second transverse plate $26_2$ a retaining chamber 40 (shown in a dashed demarcation line). The retaining pocket 38 forms part of the retaining chamber 40, the net volume of this part in this embodiment being about 40% of the net volume of the retaining chamber 40.

In the embodiment shown in FIG. 1, the retaining pockets 38 remain filled with bulk material even when the chute 10 is in a vertical position (as shown FIG. 2A). This bulk material has an excellent damping effect on the following falling bulk material. Only the upper edge 30 is stressed by the bulk material striking it. The inner face 34 of the transverse plate $26_2$ is completely covered with bulk material. The surface of the distributor chute is likewise completely covered with bulk material by the gradient of slope of the bulk material in the retaining pocket 38. The majority of the outer face 32 of the transverse plate $26_1$ is exposed, but is not directly subjected to the impacting bulk material.

If the distributor chute 10 is now pivoted from the vertical position into the horizontal position shown in FIG. 2B, the retaining pocket 38 empties partially into the remaining region of the retaining chamber 40 and thus covers a relatively large partial area of the outer face 32 of the transverse plate $26_1$. A smaller partial area of the inner face 34 of the transverse plate $26_2$ is now exposed, which has no detrimental effect because in this position that face 34 is not directly subjected to the impacting bulk material. If bulk material flows back, the retaining chamber 40 fills completely.

Regarding the design of the retaining chambers 40 and retaining pockets, it should be noted that with the distributor chute 10 in a horizontal position, the bulk material content of the retaining pockets 38 (measured with the chute 10 in a vertical position) must at least be sufficient to achieve a protective initial covering of the horizontal surface 24. It is an advantage, however, if, as shown in FIG. 2A, the surface 24 is already completely covered with bulk material with the chute 10 in a vertical position.

In FIG. 2C, the chute 10 has an angle of inclination that is slightly larger than the gradient of slope of the bulk material. If the flow of bulk material is stopped, the retaining chamber remains virtually completely filled. Only a small partial area of the outer face 32 remains exposed. It should be noted that the volume of bulk material shown in FIG. 2C forms a substantially smooth sliding surface for the following bulk material. Only the upper edges 30 of the transverse plates 26 project from this sliding surface. This has the additional advantage that the sliding properties in the impact zone are good, which ensures a good concentration of the stream of bulk material.

Longitudinal plates 42 are advantageously arranged in the retaining chambers 40 so that they subdivide each individual retaining chamber 40 into several compartments. These longitudinal plates 42 serve on the one hand to reinforce the transverse plates 26. On the other hand, a more uniform filling of the retaining chambers 40 is achieved, in particular in the lateral regions of the chute 10. In these lateral regions, the subdivisions of the retaining chambers 40 are therefore of narrower construction than in the lower region of the chute 10. It should be noted that the longitudinal plates 42 advantageously have a lower height than the transverse plates 26, so that for the most part they are covered with bulk material. Their upper edges 44 may be reinforced against wear, for example, by welding onto these edges a layer of wear-resisting hard material.

In the sliding zone 20, the chute 10 preferably has a substantially smooth discharge surface 46, formed by one or more curved plates. These curved plates are advantageously reinforced by welding onto these plates a layer of wear-resisting material. They could, however, also be integrally formed from a largely wear-resisting material. The discharge or sliding surface 46 is not fixed directly to the chute body 12 but by means of spacer webs 48. The height of these spacer webs 48 is selected such that the discharge surface 46 extends a fictitious flow surface defined by the upper edges 30 of the transverse plates without transitional discontinuity. The transition of the bulk material from the impact zone 18 to the discharge surface 46 therefore occurs through a continuous sliding, which has a beneficial effect on the life of the discharge surface 46. Between the discharge surface 46 and the chute body 12, the spacer webs 48 bound hollow compartments 50, which are preferably filled with an insulating material 52, for example mineral wool. If the chute 10 is being used to charge a furnace, its underside is exposed to the full radiation of heat and heats up far more than its upper side. The insulating material 52 reduces the temperature of the discharge surface 46 so that its serviceable life is increased. A further advantage of the hollow compartments 50 is that the hollow compartment lying beneath a rupture 54 fills with bulk material, when there is a rupture 54 in the discharge surface 46(see FIG. 3). The chute body 12 is therefore protected against abrasion wear by the bulk material 55 in the hollow compartment 50.

In another construction of the chute (not shown) the retaining pockets and retaining chambers are provided for the entire length of the chute. In the so-called sliding zone, a smooth discharge surface can then be mounted directly on the upper edge of the transverse plates. Even if the discharge surface is largely destroyed, the chute body remains especially well protected by the retaining pockets and retaining chambers arranged beneath it.

In FIG. 3, an alternate embodiment of the present invention, a distribution chute 10' is shown which differs from the distribution chute 10 of FIG. 1 only in that the retaining chambers 40 are completely filled with a material. This filling material 56 can be a castable, hardening mass (such as a ceramic concrete or a heat-protection concrete). It may also be comprised of shaped blocks which are inserted in the retaining chambers 40. Because of the special shape of the retaining chambers 40, these can be filled with a hardening filling material from above using a spray gun, even in the case of a installed chute.

The filling material can be less wear-resisting than the upper edges 30 and outer faces 32 of the transverse plates 26. If the filling material breaks up or crumbles, this has no detrimental effect on the serviceable life of the chute 10'. Because of the retaining pockets 38, broken pieces of the filling material are hardly able, in fact, to fall out of the retaining chambers 40, and form a bed therein for the following falling bulk material. Proper distribution of the partly destroyed filling 56 in the retaining chambers 40 is obtained, by the filling material preferably not adhering to the surface 24 of the chute 10' or to the inner face 34 of the traverse plates 26. The filling 56 further increases in the serviceable life of the chute 10' without making it, in comparison with the chute 10, substantially more expensive. The filled retaining chambers 40 have furthermore the advantage that better sliding conditions are obtained in the impact zone. In particular with a shallowly inclined chute, this causes an improved concentration of the stream of bulk material.

The chute according to the invention is preferably used in bell-less charging devices of shaft furnaces, for example blast furnaces. It may also be used in other furnaces or devices, in particular if the angle of inclination of the chute is variable to a large amount.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A distributor chute for the flow of bulk material, said distributor chute being for use in a bell-less blast furnace top charging device, said distributor chute having an upper surface defining an impact zone receptive to the bulk material, wherein the improvement comprises:

a plurality of inclined transverse plates disposed on said upper surface within said impact zone, each of said transverse plates having an inner face, a generally wear-resistant upper edge and a generally wear-resistant outer face, each of said transverse plates being inclined in a direction generally opposite to the flow of the bulk material to define a plurality of retaining pockets between said inner faces of said transverse plates and said upper surface of said distributor chute, said transverse plates being spaced apart along the length of said impact zone wherein each of two adjacent transverse plates define between said outer face of the first of said two adjacent transverse plates and said inner face of the second of said two adjacent transverse plates a retaining chamber with a free access opening delimited between said generally wear-resistant upper edges of the first and second of said two adjacent said transverse plates, each of said retaining chambers including a corresponding one of said retaining pockets, and each of said retaining pockets having a net volume which comprises a substantial portion of the net total volume of the corresponding retaining chamber.

2. The distributor chute of claim 1, wherein the net volume of one of said retaining pockets is at least 20% of the net total volume of the corresponding said retaining chamber.

3. The distributor chute of claim 1, wherein said transverse plates have an angle of inclination between about 40° and about 60° to said upper surface of said distributor chute.

4. The distributor chute of claim 1, wherein said retaining pockets are configured so that, with said distributor chute in a generally vertical position, said upper surface of said distributor chute in said impact zone is covered with a shock dampening layer of the bulk material.

5. The distributor chute of claim 1, wherein the bulk material has a range of particle diameters ranging up to a largest statistically relevant particle diameter, and wherein said free access openings to said retaining chambers are each larger than the largest, statistically relevant particle diameters of the bulk material.

6. The distributor chute of claim 1, further comprising:

at least one longitudinal plate disposed between at least some adjoining pairs of said transverse plates said longitudinal plates being disposed longitudinally with respect to said distributor chute and subdividing said retaining chambers.

7. The distributor chute of claim 1, wherein said distributor chute has a generally smooth and wear-resistant discharge surface at least in a discharge region of said sliding zone.

8. The distributor chute of claim 7, wherein said discharge region comprises:

a discharge surface which extends a fictitious flow surface defined by said upper edges of said transverse plates without transitional discontinuity.

9. The distributor chute of claim 7, further comprising:

a plurality of hollow compartments disposed below said discharge surface.

10. The distributor chute of claim 9, further comprising:

a thermal insulation material disposed within said hollow compartments.

11. The distributor chute of claim 1, further comprising:

a castable, hardening mass disposed within said retaining chambers.

12. The distributor chute of claim 1, further comprising:

a plurality of shaped blocks disposed within said retaining chambers.

13. A distributor chute for the flow of bulk material, said distributor chute being for use in a bell-less blast furnace top charging device, said distributor chute having an upper surface defining an impact zone receptive to a flow of bulk material and a sliding zone defining a direction of flow of the bulk material on the chute, said chute comprising:

a plurality of plates within said impact zone, each of said plates being transverse to said direction of flow on the chute and extending from said upper surface of the chute upwardly towards an upper edge of the plate, so as to be inclined in a direction opposite to said direction of flow on the chute, said upper edge being generally wear resistant, and each of said plates having an inner face facing said upper surface of the chute and an outer face located opposite to said inner face, said outer face being generally wear resistant;

said plates being spaced apart in said direction of flow, so as to define between the upper edges of adjacent plates free access opening for said bulk material, each of said access openings giving free access into a retaining chamber receptive to said bulk material, each of said retaining chambers being defined in the direction of flow by said inner face of a first transverse plate and in the opposite direction of flow by said outer face of a second transverse plate; and each of said plates being inclined on the upper surface of the chute so as to define in said retaining chambers, between the inner face of a first transverse plate and the upper surface of the chute, retaining pockets receptive to bulk material, each of said retaining pockets being dimensioned so as to have in a vertical position of the chute a retention capacity for a substantial proportion of the total volume of bulk material receivable in the corresponding retaining chamber when the chute is in a horizontal position.

\* \* \* \* \*